July 7, 1936.  H. W. PORTER ET AL  2,046,410
PIPE GUIDE AND ANCHOR FOR UNDERGROUND CONDUITS
Filed Feb. 27, 1936  3 Sheets-Sheet 1

INVENTORS
Harry W. Porter
Walter G. W. Turno
BY Harry B. Cook,
ATTORNEY

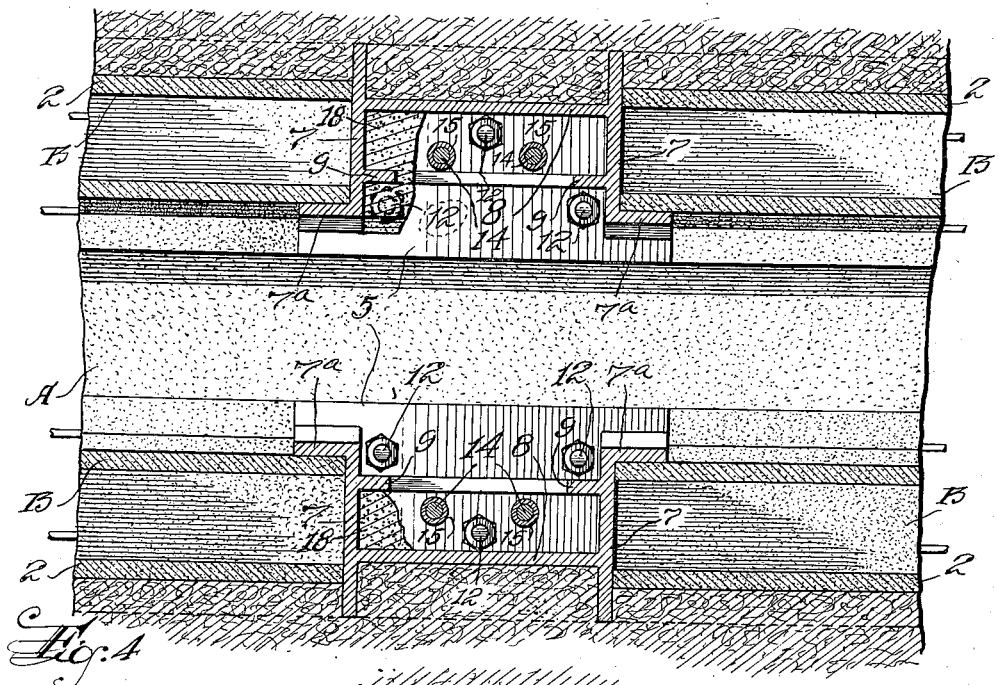

Patented July 7, 1936

2,046,410

UNITED STATES PATENT OFFICE 2,046,410

PIPE GUIDE AND ANCHOR FOR UNDERGROUND CONDUITS

Harry W. Porter, Maplewood, and Walter G. W. Turno, East Orange, N. J.

Application February 27, 1936, Serial No. 65,980

5 Claims. (Cl. 138—48)

This invention relates in general to conduits and more particularly to conduits for housing, protecting and insulating pipes which are used for example for conducting steam from a central heating plant to different buildings to be heated, and the invention is especially directed to the provision of a novel and improved guide and anchor for mounting pipes in such conduits.

For the purpose of illustrating the invention we have shown it in connection with an underground conduit like that shown in United States Patent No. 1,987,517 dated January 8, 1935, although the invention is not limited to use in this specific type of conduit.

According to general practice in underground conduits, provision is made at predetermined spaced points in the length of a conduit for expansion and contraction of the pipes in the conduit. Generally such means include loops or expansion joints in the pipe lines which are disposed in pits, and between each two adjacent pits, the pipes are positively anchored against longitudinal movement so as to cause expansion and contraction of the pipes toward the respective pits. Also at spaced points between the anchors and the pits, the pipes are mounted in guides to prevent lateral bending or distortion of the pipes under expansion and contraction.

Heretofore it has been common to construct special concrete boxes at certain points in the length of a conduit with angle iron brackets permanently embedded in the walls of the boxes and extending transversely of the conduit with the pipes secured thereto. This practice is complex and expensive.

Prime objects of our invention are to provide a novel and improved pipe guide and anchor which can be embodied directly in the walls of a conduit without modification in the structure of the walls, and the parts of which can be manufactured in advance, and easily and quickly installed in the conduit so that the necessity for special concrete pits for the guides or anchors shall be eliminated; and to provide such a guide and anchor whereby the mounting of the pipes shall be easily and quickly adjustable to suit the conditions of the particular installation.

Another object is to provide a guide or anchor of the general character described which shall be especially adaptable for use with underground conduits that include a base and separate side walls formed of identical tile sections set end to end on the top of said base, the guide or anchor to be of approximately the same size and shape as one of the side wall tiles so as to take the place of a tile in the side wall, whereby the base blocks may be built into the side walls without material modification of the latter and as the conduit is installed.

Other objects are to provide such a guide or anchor which shall include a novel and improved construction, combination and arrangement of base blocks as described, pipe supporting plates, and means for mounting the plates on the base blocks; to provide such a structure wherein the pipe supporting plates shall be easily and quickly adjustable to vary the elevation of the pipes as required by the conditions of a particular installation; to provide a guide and anchor structure which shall be relatively simple and inexpensive in structure and installation and shall be reliable and durable; and to obtain other advantages and results as will be brought out by the following description.

Referring to the accompanying drawings in which corresponding and like parts are designated throughout the several views by the same reference characters Figure 1 is a fragmentary vertical longitudinal sectional view through an underground conduit showing pipe guides and anchors embodying our invention.

Figure 4 is a horizontal sectional view on the line 4—4 of Figure 3.

Figure 5 is a view similar to Figure 3 showing a modification of the invention.

Figure 6 is a detached perspective view of one of the base blocks and

Figure 7 is a detached perspective view of one of the pipe supporting plates.

Figure 1:
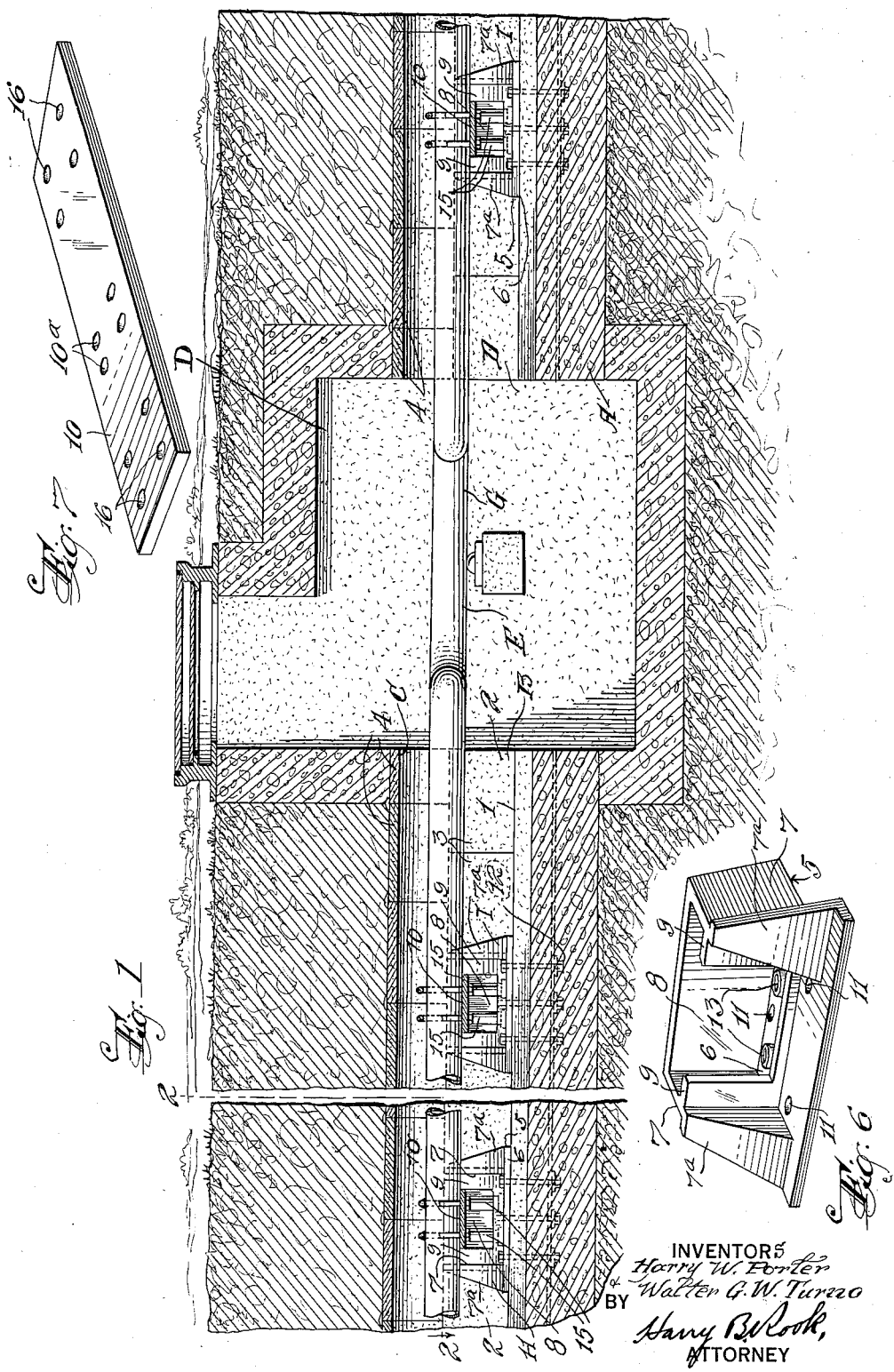
Figure 2:
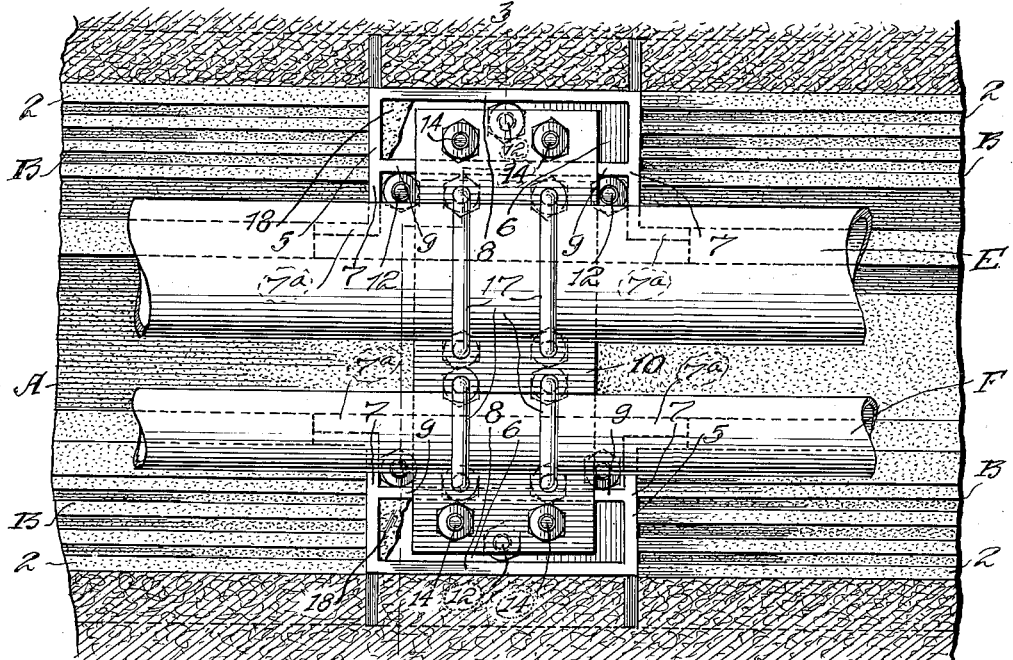
Figure 2 is a horizontal sectional view on an enlarged scale, taken on the line 2—2 of Figure 1.
Figure 3:
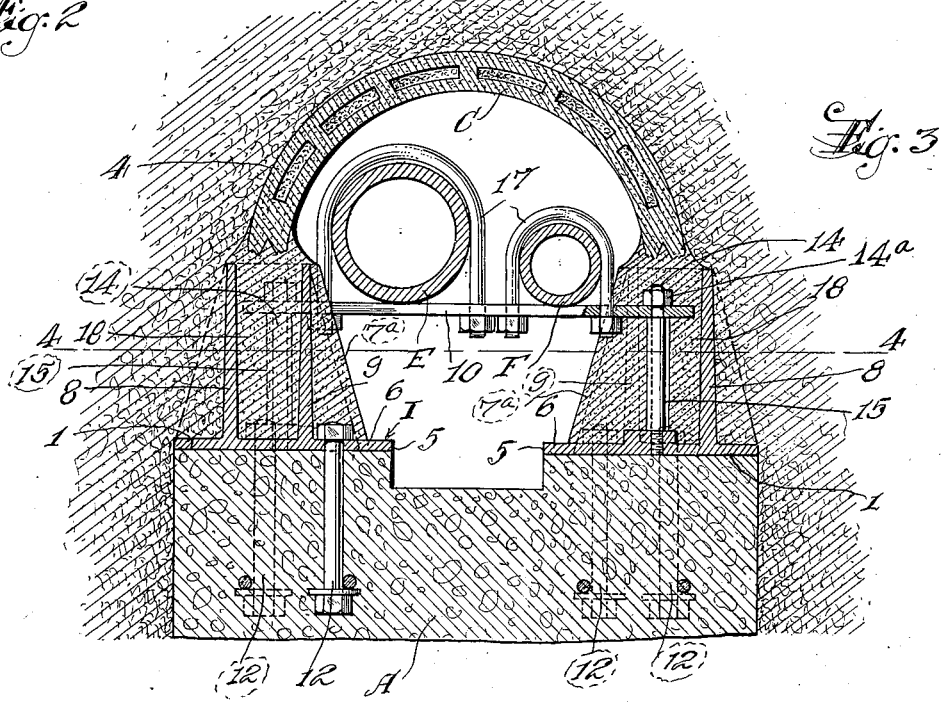
Figure 3 is a transverse vertical sectional view taken on the line 3—3 of Figure 2.

Specifically describing the illustrated embodiment of the invention, the reference character A designates the monolithic base or foundation of an underground conduit which has a substantially flat top 1 upon which are set side walls B, which in turn support a top or roof C.

The side walls B are formed of block sections which are preferably hollow tile 2, approximately trapezoidal in cross section to form hollow side walls for the conduit. These tile sections 3 are set upon the top of the base A in end to end relation to each other with the wider of the parallel sides resting upon the base.

The roof C is also formed of tile sections 4, each constituting a half section of a tile pipe. These tile sections 4 are set upon the tops of the side wall sections 3 in end to end relation to each other.

At predetermined points in the length of the conduit are provided expansion pits D in which provision is made for expansion and contraction of the pipes in the conduit. In the present instance we have shown two pipes E and F each of which has a loop G for permitting expansion and contraction of the pipes, although sometimes expansion joints of known structure are utilized instead of the loops.

Generally about half way between each two adjacent expansion pits, the pipes are anchored to the conduit so as to induce expansion and contraction to the respective pits, and between the anchors and the pits the pipes are mounted in guides to prevent lateral distortion or bending of the pipes under expansion and contraction and to insure that the expansion and contraction is absorbed in the loops or expansion joints. Our invention is a structure which can be used selectively as a guide or anchor. The structure is illustrated as an anchor by the reference character H and as a guide by the reference character I, in Figure 1 of the drawings.

Each anchor or guide includes a pair of identical base blocks 5 preferably formed of cast iron, and each block including a bottom 6, end walls 7 and a back wall 8. The block is substantially hollow with the front side and top open, and preferably the end walls have inwardly projecting ribs 9 which both reenforce the end walls and serve to locate a pipe supporting plate 10 in the block. Also the front sides of the end walls preferably have flanges 7a which are inclined to the bottom 6 at an angle approximately corresponding to the inclination of the sides of a side wall tile 3. With this construction, each base block approximates in size and shape one of the side wall tiles 3 so that the base block may be substituted for one of the tiles.

The bottom of each block has openings 11 to receive bolts 12 for anchoring the base blocks to the conduit base A, and the block has means for connecting the plate 10 thereto. As shown the block has other openings 13 in which are mounted bolts 14 which project upwardly from the bottom of the block for supporting the pipe supporting plate 10.

In installing our pipe anchor or support in a conduit, the anchor bolts 12 are embedded at the proper locations in the conduit base A. Then during erection of the side walls B of the conduit or prior thereto, the base blocks 5 are set upon the top of the conduit base A and secured by the respective bolts 12 with the open sides facing into the conduit. The bolts 14 being secured in proper position in the respective base blocks, and the desired elevation of the pipes having been predetermined, sleeves 15 of proper length are slipped over the bolts 14 with the ends of the sleeves terminating short of the upper ends of the bolts, and the pipe supporting plates 10 are then fitted over the bolts to rest upon the ends of the sleeves 15, the plate being provided with proper openings 16 to receive the bolts 14. Nuts 14a are then applied to the bolts to clamp the plate 10 between said nuts and said sleeves. Obviously by using sleeves of different lengths, the elevation of the plate 10 may be varied as desired. The plates 10 having been set, the pipes E and F may then be secured to the plates by U-bolts 17 in known manner, which are passed through openings 10a in the plate.

Where the structure is to serve as an anchor the U-bolts 17 will be tightly clamped against the pipes and preferably welded thereto, while if the structure is to serve as a guide a slight clearance will be left between the U-bolts and the pipes to permit sliding of the pipes beneath the bolts.

Then preferably the base blocks will be filled with concrete 18 to form a support for the top tile 4, and the side tiles will be built around the base blocks just as if each base block were itself a tile. The flanges 7a of the base blocks overlie the inside walls of the side tiles so as to form a more secure bond between the side tiles and the base blocks.

A modification of the invention is shown in Figure 5 where two pipe supporting plates 20 and 21 are utilized for supporting a large pipe K at the top of the conduit and two smaller pipes L below the large pipe. To utilize the space in the conduit more efficiently, the plates may be bent, as is the plate 21, and a plurality of sleeves 22 corresponding to the sleeves 15 will be utilized on the bolts 14, there being one sleeve between the bottom of each base block and the lower plate 21 and another sleeve between the plate 21 and the top plate 20 for mounting the plates at the desired elevations in the conduit.

As above stated while the invention has been described in connection with a particular form of conduit, the guide and anchor structure may be embodied in other types of conduits without departing from the spirit or scope of the invention. Furthermore, various modifications and changes in the details of structure of the guide and anchor will occur to those skilled in the art as within the scope of the invention.

Having thus described our invention, what we claim is:

1. The combination with a conduit including a base and side walls set thereon formed of block sections, and a top on said side walls, of a pipe guide or anchor comprising a pair of base blocks, each being approximately of a size and shape to replace one of said block sections and being secured on said base and built into one said side wall of the conduit, a pipe supporting plate having its ends mounted respectively on said base blocks, and means for connecting a pipe to said plate.

2. The combination with a conduit including a base and side walls set thereon formed of block sections, and a top on said side walls, of a pipe guide or anchor comprising a pair of base blocks, each consisting of a hollow casting approximately of a size and shape to replace one of said block sections and having an open top and one open side, each base block being secured on said base and built into one said side wall of the conduit with its open side facing into the conduit and its open top facing upwardly, a pipe supporting plate having one end inserted through said open top and open side of each base block, means securing said plate to said base blocks, and means for connecting a pipe to said plate.

3. The combination with a conduit including a base and side walls set thereon formed of block sections, and a top on said side walls, of a pipe guide or anchor comprising a pair of base blocks, each consisting of a hollow casting approximately of a size and shape to replace one of said block sections and having an open top and one open side, each base block being secured on said base and built into one said side wall of the conduit with its open side facing into the conduit and its open top facing upwardly, bolts projecting upwardly from the bottoms of said base blocks, sleeves on said bolts terminating short of the upper ends of said bolts, a pipe supporting plate having one end inserted through said open top and open side of each base block and formed with openings receiving said bolts, and nuts on said bolts clamping said plate between them and the respective said sleeves, and means for connecting a pipe to said plate.

4. A pipe guide or anchor for conduits comprising a pair of base blocks to be located at opposite sides of a conduit, each block consisting of a casting having a bottom, end walls, one side wall, with the other side and the top open, a pipe supporting plate having one end inserted through said open top and said open side of each base block, bolts secured in and projecting upwardly from the bottoms of said base blocks, means for mounting said plate on said bolts, and means for connecting said plate to said bolts.

5. A pipe guide or anchor for conduits comprising a pair of base blocks to be located at opposite sides of a conduit, each block consisting of a casting having a bottom, end walls, one side wall, with the other side and the top open, bolts secured in and projecting upwardly from the bottom of each base block, sleeves removably fitted over said bolts with their ends terminating short of the upper ends of the respective bolts, a pipe supporting plate having one end inserted through said open top and open side of each base block and formed with openings receiving said bolts, nuts on said bolts clamping said plate between them and the respective said sleeves, and means for connecting a pipe to said plate.

HARRY W. PORTER.
WALTER G. W. TURNO.